United States Patent
Lee et al.

(10) Patent No.: US 12,309,457 B2
(45) Date of Patent: May 20, 2025

(54) APPARATUS FOR PROVIDING RECOMMENDED BROADCASTING INFORMATION AND METHOD THEREOF

(71) Applicant: Hyperconnect LLC, Seoul (KR)

(72) Inventors: Young Soo Lee, Seoul (KR); Gi Hoon Yeom, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 18 days.

(21) Appl. No.: 18/156,269

(22) Filed: Jan. 18, 2023

(65) Prior Publication Data

US 2023/0388594 A1 Nov. 30, 2023

(30) Foreign Application Priority Data

May 27, 2022 (KR) .................. 10-2022-0065648
Nov. 8, 2022 (KR) .................. 10-2022-0147711

(51) Int. Cl.
*H04N 21/25* (2011.01)
*H04N 21/2187* (2011.01)
*H04N 21/258* (2011.01)
*H04N 21/466* (2011.01)
*H04N 21/482* (2011.01)

(52) U.S. Cl.
CPC ..... *H04N 21/4668* (2013.01); *H04N 21/2187* (2013.01)

(58) Field of Classification Search
CPC ............ H04N 21/251; H04N 21/2187; H04N 21/4668
See application file for complete search history.

(56) References Cited

U.S. PATENT DOCUMENTS

| | | | |
|---|---|---|---|
| 7,149,983 B1 * | 12/2006 | Robertson | G06F 16/248 715/810 |
| 8,514,265 B2 | 8/2013 | Goyal et al. | |
| 8,712,218 B1 * | 4/2014 | Begeja | H04N 21/25891 386/296 |
| 9,681,099 B1 | 6/2017 | Deets, Jr. | |
| 10,602,090 B2 | 3/2020 | Ahn et al. | |

(Continued)

FOREIGN PATENT DOCUMENTS

| | | |
|---|---|---|
| CN | 104980411 A | 10/2015 |
| CN | 108881780 A | 11/2018 |

(Continued)

OTHER PUBLICATIONS

European Extended Search Report for Application No. 23166149.7, Mailed May 9, 2023, 10 pgs.

(Continued)

*Primary Examiner* — Hsiungfei Peng
(74) *Attorney, Agent, or Firm* — Patent Capital Group

(57) ABSTRACT

Provided is a method for providing information by a recommendation server, the method including obtaining first information regarding a user and second information regarding broadcasts from a service server regarding broadcasts, receiving a request by the user for a recommended broadcast list from the service server, identifying, in response to the request, third information about a live-streaming broadcast based on the second information, and providing recommended broadcast list information based on the first information and the third information.

17 Claims, 10 Drawing Sheets

(56) References Cited

U.S. PATENT DOCUMENTS

| | | | |
|---|---|---|---|
| 10,972,700 | B2 | 4/2021 | Ahn et al. |
| 11,290,687 | B1 | 3/2022 | Becchetti |
| 11,463,655 | B2 | 10/2022 | Ahn et al. |
| 2006/0087553 | A1 | 4/2006 | Kenoyer et al. |
| 2012/0268553 | A1 | 10/2012 | Talukder |
| 2013/0100228 | A1 | 4/2013 | Tapia et al. |
| 2013/0242033 | A1 | 9/2013 | Kato et al. |
| 2013/0271560 | A1 | 10/2013 | Diao |
| 2014/0022334 | A1 | 1/2014 | Lockhart et al. |
| 2015/0022625 | A1 | 1/2015 | Thapa |
| 2015/0222855 | A1 | 8/2015 | Kato |
| 2016/0173821 | A1 | 6/2016 | De Magalhaes |
| 2016/0255126 | A1 | 9/2016 | Sarris |
| 2017/0085600 | A1 | 3/2017 | Carter et al. |
| 2017/0324785 | A1 | 11/2017 | Taine et al. |
| 2018/0124477 | A1 | 5/2018 | Qu et al. |
| 2019/0042585 | A1* | 2/2019 | Ploshykhyn ...... G06F 16/24578 |
| 2019/0098352 | A1* | 3/2019 | Jung ................ H04N 21/25891 |
| 2019/0268567 | A1 | 8/2019 | Ahn et al. |
| 2020/0177836 | A1 | 6/2020 | Ahn et al. |
| 2020/0358904 | A1 | 11/2020 | Ahn et al. |
| 2021/0266351 | A1 | 8/2021 | Engel et al. |
| 2021/0281801 | A1 | 9/2021 | Ahn et al. |
| 2022/0021921 | A1 | 1/2022 | Osman et al. |
| 2022/0147870 | A1* | 5/2022 | Agarwal ............ G06Q 30/0282 |
| 2022/0157345 | A1* | 5/2022 | Kim ................ H04N 21/47217 |
| 2022/0405094 | A1* | 12/2022 | Farquhar ............ G06F 9/44505 |
| 2023/0336595 | A1 | 10/2023 | Kim |

FOREIGN PATENT DOCUMENTS

| | | |
|---|---|---|
| EP | 3481058 A1 | 5/2019 |
| JP | 2012217124 A | 11/2012 |
| KR | 20070070676 A | 7/2007 |
| KR | 20100062559 A | 6/2010 |
| KR | 20110004972 A | 1/2011 |
| KR | 101047184 B1 | 7/2011 |
| KR | 20140055252 A | 5/2014 |
| KR | 20140058225 A | 5/2014 |
| KR | 101517769 B1 | 5/2015 |
| WO | 2021148013 A1 | 7/2021 |

OTHER PUBLICATIONS

Extended European Search Report for European Application No. 21160286.7, Search completed Mar. 30, 2021, Mailed Apr. 19, 2021, 9 Pgs.

Japanese Patent Application JP2021-032624 Office Action, Feb. 2, 2022, 3 pgs.

Korean Patent Office Action dated May 16, 2019 in Korean Application No. 10-2018-0024188, 7 Pgs.

Lee et al., "Understanding How Digital Gifting Influences Social Interaction on Live Streams", 21st International Conference on Human-Computer Interaction with Mobile Devices and Services, Taipei, Taiwan, Oct. 1-4, 2019, 10 pgs.

Serrano et al., "Kaleidoscope: A Cloud-Based Platform for Real-Time Video-based Interaction", 2016 IEEE World Congress on Services Computing, San Francisco, CA, USA, Jun. 27-Jul. 2, 2016, 4 pgs.

* cited by examiner

APPARATUS FOR PROVIDING RECOMMENDED BROADCASTING INFORMATION AND METHOD THEREOF

CROSS-REFERENCE TO RELATED APPLICATION(S)

This application claims the benefit of Korean Patent Application No. 10-2022-0065648 filed on May 27, 2022, and Korean Patent Application No. 10-2022-0147711 filed on Nov. 8, 2022, in the Korean Intellectual Property Office, the disclosures of which are incorporated herein by reference in their entireties.

BACKGROUND

1. Field of the Invention

The present disclosure relates to an apparatus for providing recommended broadcasting information and a method thereof. More specifically, the present disclosure relates to a method for obtaining first information regarding a user and second information regarding broadcasts from a service server, receiving a request by the user for a recommended broadcast list from the service server, identifying, in response to the request, third information about a live-streaming broadcast based on the second information, and providing recommended broadcast list information based on the first information and the third information, and an apparatus (server) using the same.

2. Description of the Related Art

With the development of the electronic technology, the Internet broadcasting has been generalized. As the number of streamers (hosts) who provide the Internet broadcasting increases and the topics covered in the Internet broadcasting are diversified, the number of viewers who watch the Internet broadcasting is consistently increasing.

Under the circumstance, the quantity of contents accessible to users through the Internet broadcasting rapidly increases, and thus, users have more difficulties in searching and watching the desired broadcasts. Hence, there have been attempts to recommend personalized broadcastings in consideration of personal information of the user, previous viewing history, etc. However, due to the characteristic of the Internet broadcasting that any individual can easily become a host of an Internet broadcasting (that is, a host of a streaming), a very large quantity of computation is required for determining a specific broadcast, among a lot of broadcasts, that an individual user may be interested in. Accordingly, there is a need for methods for effectively using resources and reducing delays.

Meanwhile, the recommendation of the personalized broadcasting may provide a convenience to the user who wants to watch the broadcasting, but can give beginner hosts who try to start (or who recently have started) the streaming service disadvantages because such recommendation may reduce opportunities to expose their broadcasting to viewers. Thus, there is a need for a solution to properly adjust this situation.

In this regard, prior documentation, for example, KR101517769B1 or KR101047184B1 may be referenced.

SUMMARY

An aspect provides an apparatus for obtaining first information regarding a user and second information regarding broadcasts from a service server regarding broadcasts, receiving a request by the user for a recommended broadcast list from the service server, identifying, in response to the request, third information about a live-streaming broadcast based on the second information, and providing recommended broadcast list information based on the first information and the third information, and a method thereof.

However, the goals to be achieved by example embodiments of the present disclosure are not limited to the technical aspects described above, and other goals may be inferred from the following example embodiments.

According to an example embodiment, there is provided a method for providing information by a recommendation server, the method including obtaining first information regarding a user and second information regarding broadcasts from a service server regarding broadcasts, receiving a request by the user for a recommended broadcast list from the service server, identifying, in response to the request, third information about a live-streaming broadcast based on the second information, and providing recommended broadcast list information based on the first information and the third information.

According to an example embodiment, the obtaining of the first information and the second information may include obtaining at least one of the first information and the second information from a data bus which repeatedly receives information transmitted from the service server.

According to an example embodiment, the obtaining of the first information and the second information may further include transmitting a request for at least one of the first information and the second information to the data bus, and the request transmitted to the data bus may include information on the user.

According to an example embodiment, the identifying of the third information may include obtaining one or more pieces of information from a database set to be associated with the recommendation server.

According to an example embodiment, the providing of the recommended broadcast list information may include obtaining the recommended broadcast list information using machine learning based on the first information and the third information.

According to an example embodiment, the providing of the recommended broadcast list information may further include determining a model for using the machine learning based on at least one of the first information, the second information, and the third information.

According to an example embodiment, the third information may include at least one of broadcasting history information corresponding to a host of the live-streaming broadcast and viewer information of the live-streaming broadcast.

According to an example embodiment, the providing of the recommended broadcast list information may include identifying a beginner host based on at least one of the broadcasting history information and the viewer information, and determining a recommended broadcast list such that a portion of the broadcast by the beginner host is higher than a predetermined value.

According to an example embodiment, the third information may include broadcasting image information corresponding to the live-streaming broadcast.

According to an example embodiment, the recommendation server may include a first sub-unit including an application programming interface (API) server and a second sub-unit configured to obtain the recommended broadcast list information.

According to an example embodiment, at least one of the first information and the second information may correspond to the information obtained by the service server from a database set to be associated with the service server.

According to an example embodiment, the first information may include at least one of account information of the user, personal information of the user, and broadcast viewing history information of the user.

According to an example embodiment, the service server may include a plurality of sub-components associated with different broadcasting services.

According to an example embodiment, there is provided a system for providing recommended broadcast list information, the system including a service server configured to provide a broadcasting service and a recommendation server configured to provide recommended broadcast list information based on received information, wherein the recommendation server is configured to obtain first information regarding a user and second information regarding broadcasts from the service server, receive a request by the user for a recommended broadcast list from the service server, identify, in response to the request, third information about a live-streaming broadcast based on the second information, and provide the recommended broadcast list information based on the first information and the third information.

Details of other example embodiments are included in the following detailed description and the accompanying drawings.

According to the present disclosure, it is possible to provide a recommendation server for providing recommended broadcasting information and a method thereof, which may effectively recommend broadcastings in which a user may be interested while preventing occurrence of excessive computation or excessive delays.

According to an example embodiment of the present disclosure, it is possible to reduce the communication cost and the distribution period of the service by lowering a degree of coupling between microservices.

Further, according to an example embodiment of the present disclosure, it is possible to make the users' watching easier and avoid a circumstance that a beginner host is neglected by the users, by determining a recommended broadcast list such that a portion of the broadcast by the beginner host is higher than a predetermined value.

Effects of the present disclosure are not limited to those described above, and other effects may be made apparent to those skilled in the art from the following description.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
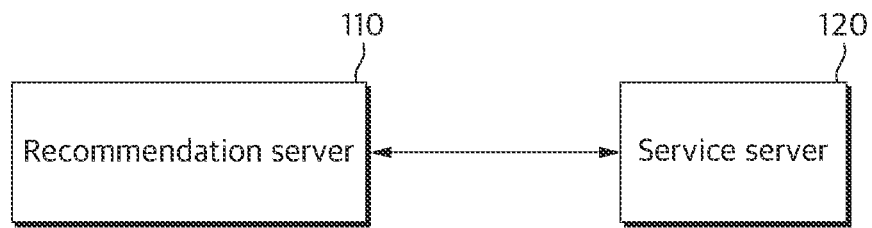
FIG. 1 is a schematic diagram illustrating a system for providing recommended broadcasting information according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" or "comprising" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meaning: A alone; B alone; C alone; both A and B together; both A and C together; both B and C together; or all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

Example embodiments of the present disclosure will be fully described in a detail below which is suitable for implementation by those skilled in the art with reference to the accompanying drawings. However, the present disclosure may be implemented in various different forms, and thus it is not limited to embodiments to be described herein.

Hereinafter, example embodiments of the present disclosure will be described in detail with reference to the accompanying drawings.

In describing the example embodiments, descriptions of technical contents which are well known in the technical field to which the present disclosure pertains and are not directly related to the present disclosure will be omitted herein. This is to more clearly convey the gist of the present disclosure by omitting unnecessary descriptions.

For the same reason, some components in the accompanying drawings may be exaggerated, omitted, or schematically illustrated. In addition, a size of each component does not fully reflect an actual size. In each of the accompanying drawings, the same or corresponding components are assigned the same reference numerals.

The advantages and features of the present disclosure and the manner of achieving the advantages and features will become apparent with reference to the embodiments described in detail below with the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art, and the present disclosure is defined by merely the scope of the appended claims. Throughout the specifications, like reference numerals denote like components.

In this case, it will be understood that each block of flowchart diagrams and combinations of the flowchart diagrams may be performed by computer program instructions. These computer program instructions may be embodied in a processor of a general purpose computer, a special purpose computer, or other programmable data processing equipment such that the instructions performed by the processor of the computer or other programmable data processing equipment generate parts for performing functions described in flowchart block(s). These computer program instructions may use a computer or other programmable data processing equipment for implementing a function in a specific manner or may be stored in a computer readable memory, and thus the instructions which use the computer or are stored in the computer readable memory may produce a manufacturing article including instruction parts for performing the functions described in the flowchart block(s). Since the computer program instructions can also be embedded in the computer or other programmable data processing equipment, instructions, which a series of operations are performed on the computer or other programmable data processing equipment to generate a computer-executed process, thereby operating the computer or other programmable data processing equipment, can provide operations for performing the functions described in the flowchart block(s).

In addition, each block may represent a module, segment, or a portion of a code, which includes one or more executable instructions for executing specified logical function(s). It should also be noted that, in some alternative embodiments, it is also possible for the functions mentioned in the blocks to occur out of the order. For example, two blocks shown in succession may, in fact, be executed substantially concurrently, or the blocks may sometimes be executed in the reverse order, depending upon the functionality involved.

FIG. 1 is a schematic diagram illustrating a system for providing recommended broadcasting information according to an example embodiment.

According to various example embodiments, the system for providing the recommended broadcasting information includes a recommendation server 110 and a service server 120. The system for providing the recommended broadcasting information according to an example embodiment may further include a network supporting data transmission and reception performed between at least a portion of the recommendation server 110, the service server 120, and an external device.

The system for providing the recommended broadcasting information according to an example embodiment may further include one or more databases. The system for providing the recommended broadcasting information according to an example embodiment may further include a data bus which provides a data travel path for data transmission and reception between servers. Details for the one or more databases and the data bus will be described in detail with reference to FIGS. 6 and 7.

The recommendation server 110 and the service server 120 of the system for providing the recommended broadcasting information may include a transceiver, a memory, and a processor. Further, each of the recommendation server 110 and the service server 120 may include a unit for processing one or more functions or operations, which may be implemented through hardware, software, or a combination of hardware and software.

Meanwhile, throughout the example embodiments, the recommendation server 110 and the service server 120 are described as separate devices and servers but may be implemented together in a logically divided structure based on separate functions in a single device or server. For example, the service server 120 may include the recommendation server 110 or may be coupled to the recommendation server 110 to form a single body. Even in this case, a recommended broadcasting information providing method performed through data transmission and reception between the recommendation server 110 and the service server 120 may be similarly performed. In the case that a device includes the recommendation server 110 or is coupled to the recommendation server 110 to form a single body, the communication of the recommendation server 110 may be understood as a process of transmitting and receiving data between components inside the device (for example, with a processor of the corresponding device).

According to an example embodiment, the recommendation server 110 and the service server 120 may include a plurality of computer systems or computer software embodied by a network server. For example, at least part of the recommendation server 110 and the service server 120 may be a computer system and computer software which are connected with a sub-device which may communicate with another network server through a computer network such as Intranet or Internet to accept a request for performing operation, to perform the related operation, and to provide the results of the performance. Moreover, it can be broadly understood that at least part of the recommendation server 110 and the service server 120 may include a series of application programs which may operate on the network server and all types of databases internally embedded. For example, at least part of the recommendation server 110 and the service server 120 may be embodied by using network server programs which are variously provided according to the operation system such as DOS, Windows, Linux, UNIX or MacOS.

Hereinafter, for the sake of convenience in explanation, the recommendation server 110 and the service server 120 are referred to as the "server," but the recommendation server 110 and the service server 120 should be understood as a comprehensive type of electronic devices which may correspond to various types of devices such as a computer device and mobile communication terminal, include various types of devices or be included in various types of devices.

The recommendation server 110, which is a device for executing a logic for recommending a broadcast to a user, may execute at least a portion of various logics including a logic for gathering and processing information necessary for recommendation, a logic for identifying hosts who are on air, a logic for executing a recommendation algorithm (for example, a logic for identifying and executing a machine learning model for recommendation), and a logic for providing the recommended broadcast list.

More specifically, the recommendation server 110 may provide the recommended broadcasting information in response to a request by the user (as described below, the request is not limited to a request by the user, but may be understood as including a request transmitted by, for example, the service server 120 itself). More specifically, the recommendation server 110 may obtain first information regarding a user and second information regarding broadcasts from the service server 120, receives a request by the user for recommended broadcast list from the service server 120, identifies, in response to the request, third information about a live-streaming broadcast based on the second information, and provides recommended broadcast list information based on the first information and the third information. In this regard, the recommendation server 110 may repeatedly obtain the information regarding the user and the information regarding broadcasts from the service server 120. In a more specific example embodiment, while the recommendation server 110 repeatedly (may indicate periodically, but is not limited thereto) receives the information regarding the user and the information regarding broadcasts, regardless of whether a request by the user for the recommended broadcast list is received, if a request of the user for the recommended broadcast list is received, the recommendation server 110 may identify, in response to the request, third information based on the second information and provide the recommended broadcast list information based on the first information and the third information. In this case, it can be understood that the second information which serves as a basis for identifying the third information and the first information which serves as a basis for the recommended broadcast list information may not be limited to one specific piece of information, but may comprehensively represent a plurality of pieces of information repeatedly obtained. In other words, it can be understood that the second information which serves as a basis for identifying the third information can include at least part of "information regarding broadcasts" repeatedly obtained, and the first information which serves as a basis for the recommended broadcast list information can include at least part of "information regarding the user" repeatedly obtained.

The service server 120 is a device for executing logics regarding live-streaming, which may process a variety of events for providing a broadcast service such as starting and ending the broadcast, or entry and exit of viewers. Further, the service server 120 may execute the operation of sending a request to the recommendation server 110 in order to import the recommended broadcast list. Hereinafter, for the sake of convenience in explanation, the request sent to the service server 120 is referred to as the "request by a user," but it is not only when there is the request by the user that the service server 120 may request the broadcast list to the recommendation server 110. For example, even without any special request by a user, if a certain period of time has passed after the user access, the service server 120 may automatically sends a request to the recommendation server 110 in order to update the broadcast list. As such, there may be many different example embodiments.

The service server 120 may provide the information received from the recommendation server 110 to the user, receive an input from the user, and transmit the inputted information to the recommendation server 110. The input received from the user may include various types of inputs such as a click using a mouse, a touch using a touch pad or touch screen, voice recognition, and other electronic inputs. The input received from the user may include the request by the user for the recommended broadcast list, but is not limited thereto.

The service server 120 may receive a request, information, and the like from various entities in addition to the recommendation server 110 and the user, and perform operations based on the request, the information, and the like. For example, the service server 120 may receive a broadcast start input from the host of the broadcast related to service providing, and process, in response to the input, information in order to provide a broadcasting transmission service.

Furthermore, the service server 120 may perform various operations as an entity providing a broadcasting service.

More details about the operations of the recommendation server 110 and the service server 120 will be described in conjunction with FIGS. 2, 6, and 7.

A series of operations related to methods for providing information according to various example embodiments may be embodied by a single physical device or in a way of organically combining a plurality of physical devices. For example, a portion of the elements included in the system for providing the recommended broadcasting information may be embodied by a physical device, and the remaining portions may be embodied by another physical device. For example, a physical device may be embodied by part of the recommendation server 110, and another physical device may be embodied by part of the service server 120 or part of other external devices. In some cases, the components included in the system for providing the recommended broadcasting information may be distributed and arranged on different physical devices, and the distributed and arranged components may be organically combined and embodied to perform the functions and operations of the system for providing the recommended broadcasting information. For example, the recommendation server 110 of the present disclosure may include one or more sub-devices, some operations described as being performed by the recommendation server 110 may be performed by a first sub-unit, and some other operations may be performed by a second sub-unit. Further, the service server 120 of the present disclosure may include a plurality of sub-components associated with different broadcasting services, and the operations described as being performed by the service server 120 may be divided and performed by the plurality of sub-components.

In this regard, more details about an example of the recommendation server 110 including a plurality of sub-units and an example of the service server 120 including a plurality of sub-components will be described in conjunction with FIG. 7.

Figure 2:
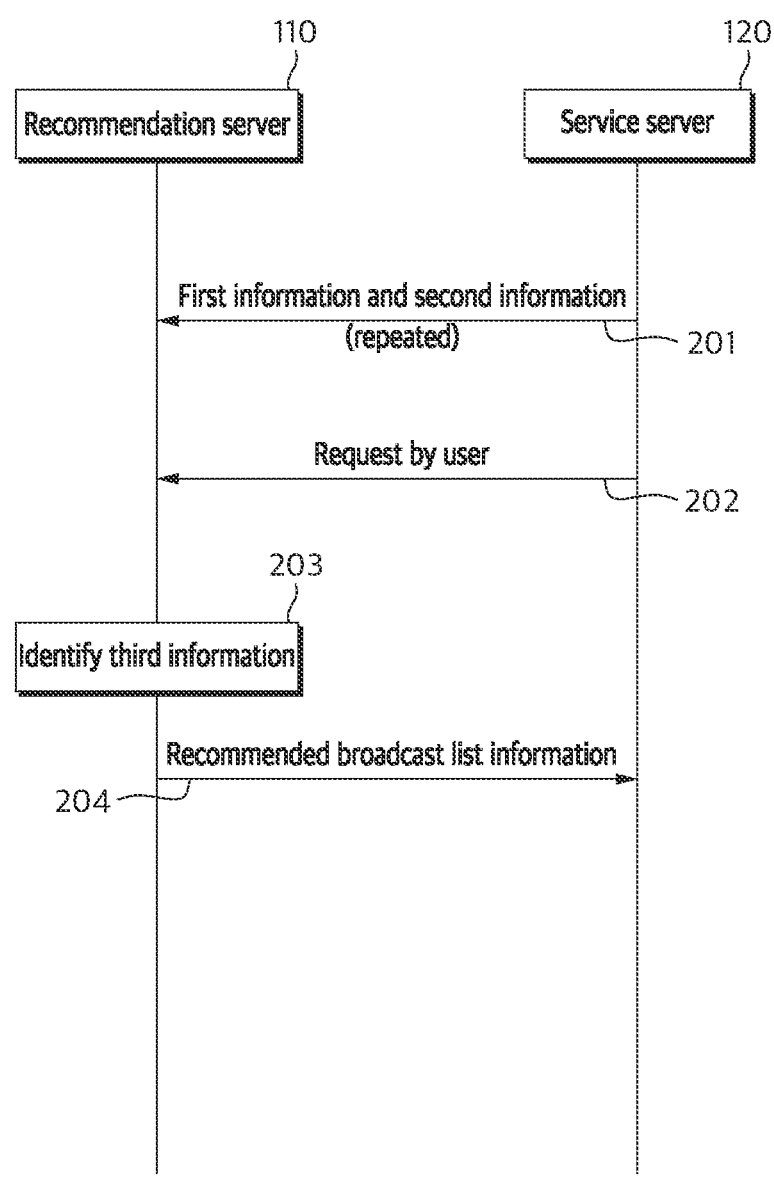
FIG. 2 is a flowchart illustrating operations of a method for providing information to a recommendation server in a system for providing recommended broadcasting information according to an example embodiment.

FIG. 2 is a flowchart illustrating operations of a method for providing information to a recommendation server in a system for providing recommended broadcasting information according to an example embodiment.

Referring to FIG. 2, in operation 201, the recommendation server 110 according to an example embodiment obtains first information regarding a user and second information regarding broadcasts from the service server 120. In this regard, the recommendation server 110 may repeatedly obtain the information regarding the user and the information regarding broadcasts from the service server 120. In this case, the first information may include at least part of the "information regarding the user" repeatedly obtained, and the second information may include at least part of the "information regarding broadcasts" repeatedly obtained. Further, if the first information and the second information are repeatedly received, the receiving methods may include both of a periodically receiving method and an aperiodically receiving method.

The first information may include at least one of identification information of the user, account information of the user, and personal information of the user (for example, a gender of the user, a country code corresponding to the user, etc.). According to an example embodiment, the first information may include at least one of a language used by the user, an operation system of a user device, a method by which the user joined the service, and a date when the user joined the service. According to an example embodiment, the first information may include the broadcast viewing information of the user, and more specifically, may include at least one of host identification information of the broadcasting which the user watched, and a number of views and watch time (more specifically, the watch time may also include a time when the view starts, a time when the view ends, etc.).

In some cases, the first information may further include at least one of gift data and report data. The gift data, which corresponds to the details of the user's sponsorship to the host, may include at least one of the identification information of the user, the identification information of the host who has received the gift, the detailed description of the gift and the time of gift sponsorship. The report data, which corresponds to the details of reporting any unfair behaviors (including various behaviors such as prohibited activities and illegal acts in terms of service provision), etc., may include at least one of identification information of a reporter, identification information of a reportee, a type of the reporter (viewer/guest/host, etc.), a type of the reportee, a reporting time and the presence of restriction.

In addition, the first information is not only limited to the aforementioned elements, but may include various contents.

The second information may include at least one of the identification information of the host, a gender of the host, and a country code of the host. According to an example embodiment, the second information may include at least one of the language used by the host, the operation system of the host device, the method by which the host joined the service, the date when the host joined the service, and the date when the host started the broadcasting.

According to an example embodiment, the second information may include the viewer information per broadcasting, and more specifically, may include at least one of the user identification information of the viewer per broadcasting, the host identification information per broadcasting, the watch time of the viewer (more specifically, the watch time may also include when the view starts, when the view ends, etc.) and broadcasted time (more specifically, the broadcasted time may also include when the broadcast starts, when the broadcast ends, etc.). According to an example embodiment, the second information may include broadcasting image information regarding broadcasts. The broadcasting image information may include various images, and for example, may include at least one of thumbnail image information set by the host, image information captured from the screen of the host's broadcasting and the image information captured from a viewer list.

In some cases, the first information and the second information may include the information processed by the service server 120 and the like. For example, the second information may include analysis information on which age group and gender group of viewers prefer the host's broadcasting the most.

Further, at least one of the aforementioned gift data and report data may be included in the second information. In this case, the gift data, the report data, etc. may be included in all of the first information and the second information, or may be included in either of them (even if the gift data, the report data, etc. are included in all of the first information and the second information, the data included in each information are not the same, and the data may be classified into the data associated with a viewer and the data associated with a host, and then may be stored, separately).

According to an example embodiment, at least one of the first information and the second information may be received through the data bus. In other words, in some cases, at least part of the first information and the second information may be received through the data bus, or may be received directly from the service server 120, without going through the data bus. However, even if the data bus exists, the data to be transmitted from the service server 120 to the recommendation server 110 may not go through the data bus.

More detailed examples regarding the data bus will be described in conjunction with FIGS. 6 and 7.

In operation 202, the recommendation server 110 receives a request by the user for the recommended broadcast list from the service server 120. In operation 203, the recommendation server 110, which has received the request by the user, identifies, in response to the request, the third information about the live-streaming broadcast based on the second information. The third information may include the information processed based on the second information. For example, the third information may include the determination information on the average watch time of male viewers and the average watch time of female viewers for a specific host's broadcasting. Further, the third information may include the determination results on the age group and gender group with the highest preference for a specific host's broadcasting and those with the lowest preference. In addition, the third information may be the information which has been processed to include the aggregated data based on the second information.

The third information may include at least one of broadcasting history information corresponding to the host of the live-streaming broadcast, and viewer information of the live-streaming broadcast (the third information may include the information regarding the host who is live-streaming, out of the second information, and the example embodiment that the third information includes the broadcasting history information may be understood in this context). As will be described below, the recommendation server 110 according to an example embodiment may identify a beginner host based on the broadcasting history information and the viewer information included in the third information, and provide the recommended broadcast list information by considering an identification result of the beginner host in operation 204 as described below.

In this regard, the broadcasting history information relates to the information regarding the history of the contents broadcasted by the corresponding host, and may include at least part of, for example, how many times the host has broadcasted, an average broadcasting time by the host, a time zone of the host's broadcasting, an average number of viewers of the host's broadcasting, an average watch time of the viewers for the host's broadcasting, and the like Meanwhile, the viewer information of the broadcasting relates to information regarding how many people are watching the corresponding host's broadcasting, and may include at least part of information such as a number of current viewers per broadcasting, an average watch time of the viewers per broadcasting, etc.

In some cases, it may be possible to identify a beginner host based only on the second information without considering the third information. In this case, there is a disadvantage that real-time viewer information, and the like cannot be considered, but there is also an advantage that the computation and the delay time may be reduced since the real-time information is not considered. Hereinafter, with respect to the overall operations described to be performed based on the third information, it can be understood that the corresponding operations may be performed based on the second information or may be performed further based on the second information, and such expression as the operations are performed based on the third information may be understood to be for easy explanation.

According to an example embodiment, the third information may include the broadcasting image information corresponding to the live-streaming broadcast. The broadcasting image information may include the thumbnail image information set by the host. Further, the broadcasting image information may include the image information captured from a live broadcast screen where the host is live-streaming. Moreover, the broadcasting image information according to an example embodiment may further include additional information determined based on the image (for example, brightness of the broadcasting screen, theme of the broadcasting, gender of the host, whether the host wears a mask, the number of people appeared on the broadcasting, etc.).

In addition, in some cases, the third information is not only limited to the aforementioned example embodiments such as the characteristics of the host, the contents of the broadcasting, and the like and may include various pieces of information.

Figure 6:
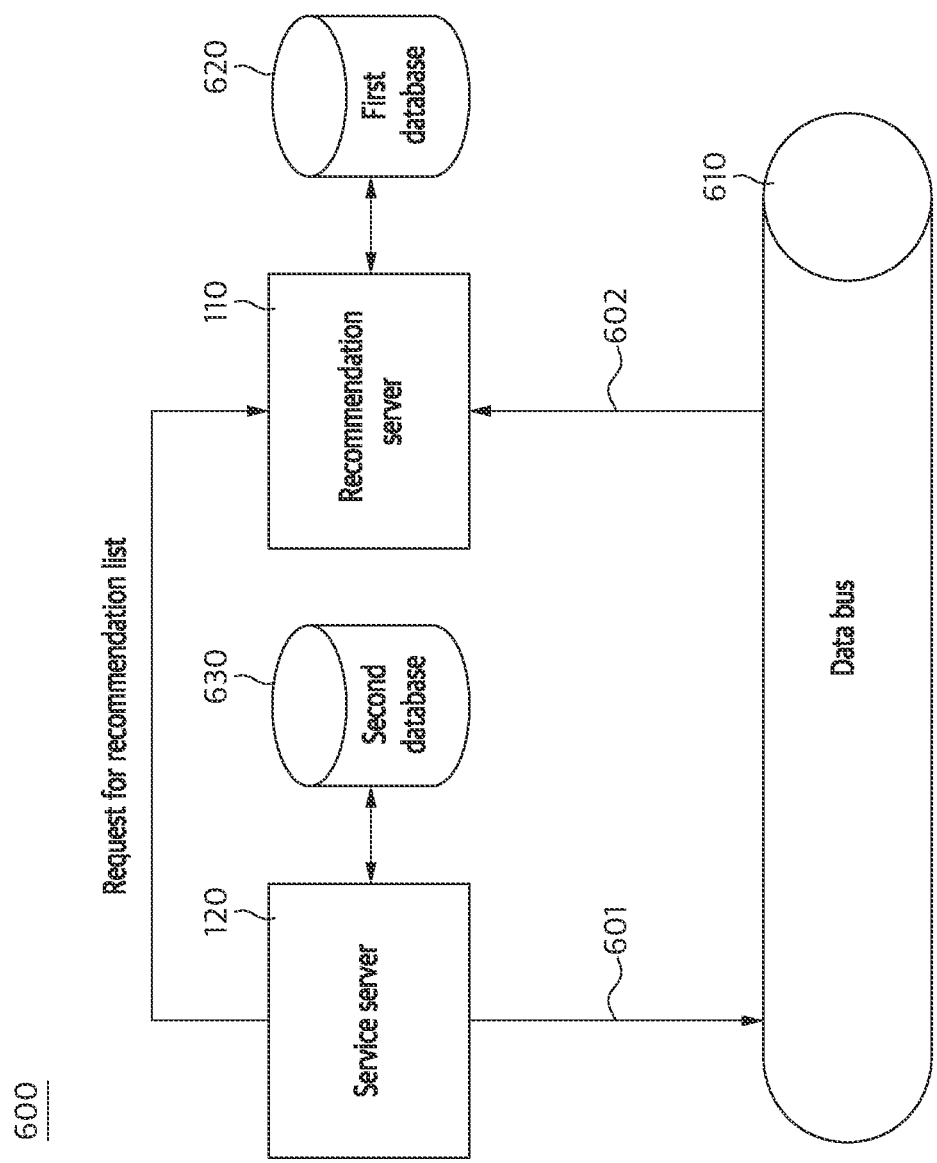
FIG. 6 is a detailed diagram illustrating a system for providing recommended broadcasting information based on a second architecture according to an example embodiment.
Figure 7:
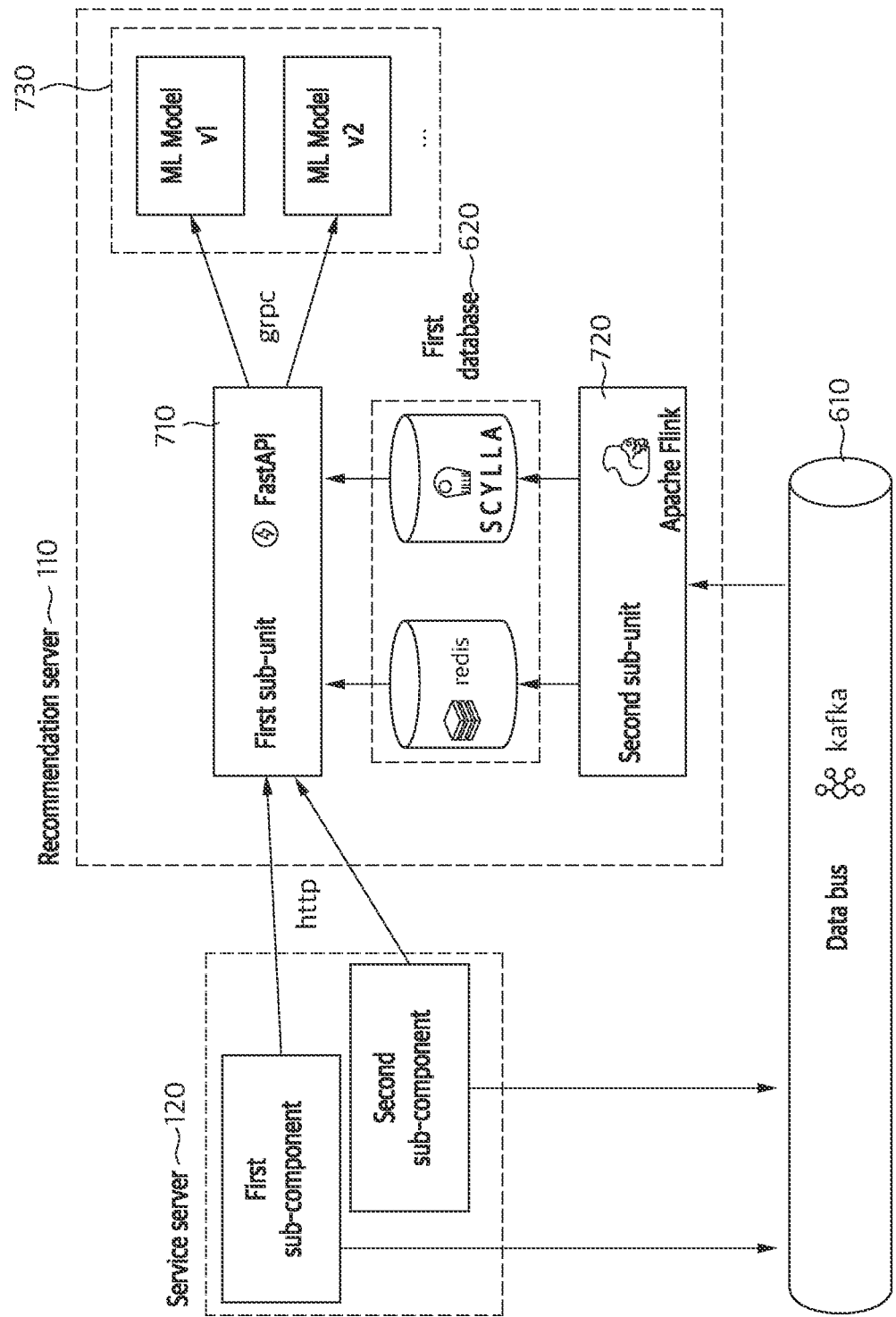
FIG. 7 is a diagram illustrating overall operations of a system for providing recommended broadcasting information according to an example embodiment.

According to an example embodiment, the recommendation server 110 may identify the third information by obtaining one or more pieces of information from the database set to be associated with the recommendation server 110, which will be illustrated in more detail in conjunction with FIGS. 6 and 7.

In operation 204, the recommendation server 110 provides the recommended broadcasting list information based on the first information and the third information. The recommendation server 110 may obtain the recommended broadcast list information using machine learning based on the first information and the third information. In this regard, at least part of the first information and the third information may be used as an input of a machine learning model. Further, at least part of the first information and the third information may be used for determining which model to use. For example, when the third information includes the gender information of a host, the gender of the host may be included in a parameter input to the machine learning model, but also otherwise the model itself to be used for obtaining the recommended broadcast list information may be determined differently depending on the gender of the host.

Regarding operation 204, in some cases, the information serving as a basis for providing the recommended broadcast list information also may further include the second information. For example, the second information may be used as an input of the machine learning model and also may be used for determining which model to use. Hereinafter, for the sake of convenience in explanation, the information regarding operation 204 is described with the first information and the third information, but it can be understood that the information regarding operation 204 may also include the second information.

In some cases, in addition to the case that at least part of the first information and the third information are directly input to the machine learning model, the information processed based on at least part of the first information, the second information, and the third information may be used as an input of the machine learning model. For example, if at least one of the second information and the third information includes the broadcasting image information, the recommendation server 110 may further obtain additional information (which may be processed information), such as brightness of the broadcasting screen, the theme of the broadcasting, the gender of the host, and whether the host wears a mask, based on at least one of the second information and the third information, and the processed information may be input to the machine learning model. Further, the recommendation server 110 may further obtain the analysis information on which age group and gender group of the viewers prefer the host's broadcasting the most, based on at least one of the second information and the third information, and may input the processed information to the machine learning model. Besides, there may be various examples that the recommendation server 110 processes information.

Further, the processed information may be used for determining which model to use.

As mentioned above, the recommendation server 110 according to an example embodiment may identify a beginner host based on at least one of the broadcasting history information, the viewer information of the broadcasting, and the like included in the third information, and provide the recommended broadcast list information by considering an identification result of a beginner host. The beginner host may correspond to the case that the host has a little broadcasting experience, and/or the case that the host has a small number of viewers, and the like. For example, a beginner host may be defined as a host who has a total broadcasting time of less than 5 hours and/or the number of current broadcasting viewers of less than 20, but this is merely an example and the scope of the present disclosure is not limited thereto.

With respect to considering the identification result of the beginner host, more specifically, the recommendation server 110 according to an example embodiment may determine the recommended broadcast list such that a portion of the broadcasts on the recommended list by beginner hosts is higher than a predetermined value. In this regard, the recommendation server 110 may train a model such that a portion of the broadcasts on the recommended list by beginner hosts is higher than a predetermined value, and the recommendation server 110 may add a beginner host's broadcasting to the list based on the output of the model and determine the broadcast list according to other various methods.

Setting a portion of the broadcasts on the recommended list by beginner hosts to be higher than a predetermined value may promote new hosts to begin the broadcasting and encourage the beginner hosts to continue the broadcasting.

Furthermore, there may be various example embodiments for diversifying the recommended broadcast list, such as determining a recommended broadcast list such that broadcasts in various categories are included, in addition to the broadcasting of beginner hosts, or determining a recommended broadcast list such that the representative broadcasts in each category are essentially included.

Meanwhile, with respect to the operation of determining which model to use based on at least part of the first information, the third information and the processed information, which model to use may be determined by following the predetermined rules depending on each circumstance. The rules may be set based on results of empirical determination on the most appropriate model for each circumstance based on the methods such as an A-B test, but the set-up method for the rules is not only limited to this method. According to an example embodiment, whether the model is appropriate may be determined by considering at least one of various elements such as the user's satisfaction, the host's convenience and the computation reduction, and even considering various elements, how much each element is weighted may be determined flexibly (for example, in the case that providing the most appropriate recommended broadcast list to the user is considered as the most important, the other elements such as the host's convenience and the computation reduction may be weighted less, and for example, the corresponding elements may be considered less in determining the comprehensive relevance factors).

Figure 3:
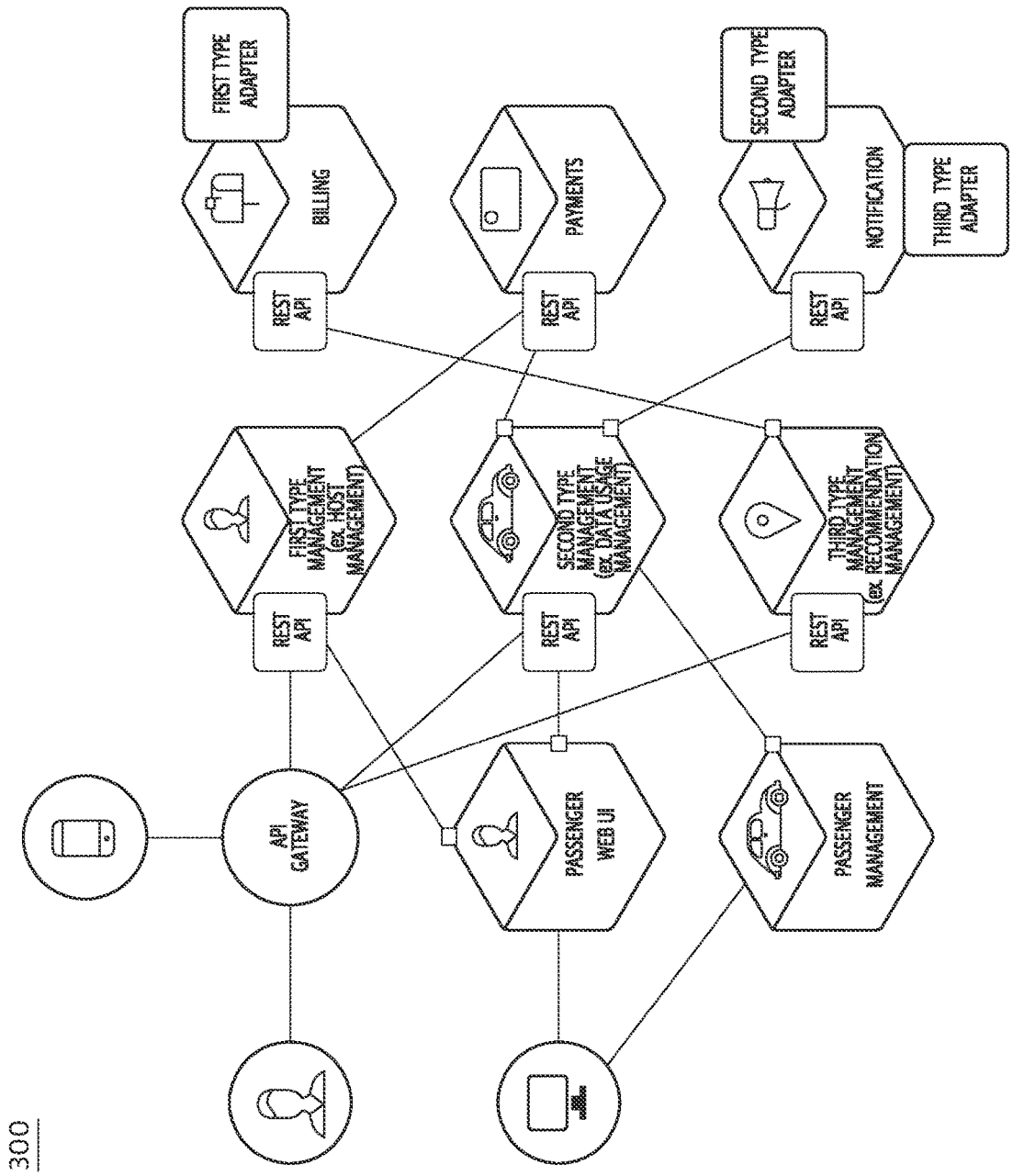
FIG. 3 is a diagram illustrating a first architecture for providing a plurality of services according to an example embodiment.

FIG. 3 is a diagram illustrating a first architecture for providing a plurality of services according to an example embodiment.

FIG. 3 illustrates an example 300 of the first architecture for providing a plurality of services according to an example embodiment. The first architecture may be referred to as Microservice Architecture (MSA), but is not limited to or bound by a specific name.

The method for providing the recommended broadcast list information according to the present disclosure may be sophisticated in terms of the implementation compared to general recommendation methods. Specifically, with respect to the provision of the recommended broadcast list information, only the hosts who are currently broadcasting may be the subject to the recommendation, and the content of the broadcasting (e.g., context) also may vary depending on various elements of the time zone of the broadcasting and the presence of special events, and thus, the real-time performance of the recommendation may be important. However, using the real-time context requires more engineering works. For example, a recommendation system in which the real-time performance is relatively less important may be operated flexibly in a way of calculating the recommendation list with a batch job in a certain cycle, storing the result in a database, and simply fetching the data. In contrast, in a recommendation system in which the real-time performance is relatively important, a recommendation model may be inferred in real time whenever the user requests the recommendation list, and additional engineering works such as importing the input feature of the model in real time for inferring the model may be required. As the additional engineering works are required, an implementation of a backend system for the recommendation may be complicated.

Moreover, if the recommendation system in which the real-time performance is embedded as a monolithic architecture, a logic for providing a service (e.g., broadcasting service) and a logic for recommendation may be strongly tied, thereby having mutual dependence. If a strong dependency relationship occurs between codes, new codes may not be added unless the dependent codes are updated accordingly to account for the addition, and the communication cost with people in charge may increase. Further, sensitive information may not be appropriately isolated and numerous codes may access the sensitive information, thereby deteriorating the security. Furthermore, if the recommendation system is embedded as a monolithic architecture, the cooperation is required with various developers participating in the software development and the distribution should be carried out according to the schedule of product release altogether, and thus, each organization (for example, an artificial intelligence (AI) research organization) may have difficulties in improving the algorithm to independently proceed with experiments and this may lead to the deterioration in the development speed.

Consequently, the first architecture may be used for effectively developing and operating the recommendation system with high complexity.

The first architecture is a pattern or an approach of dividing complex and large software into a plurality of small and independent modules. When the first architecture is applied, there may be an advantage that the distribution period is shortened compared to the case when the first architecture is not applied. In particular, the greater the number of organizations participating in developing products, services, and the like, the greater the advantage. Due to this advantage, in the system for providing the recommended broadcasting information of the present disclosure, the recommendation server 110 for the recommendation and the service server 120 for providing the broadcasting service are separated, thereby making each server focus on its own role to enable effective operations.

Meanwhile, even with the first architecture is used, if interactions between the microservices increases, for example, if the request for an Application Programming Interface (API) between microservices becomes frequent, and the shared database occurs, loose coupling which was originally an advantage of the microservice may be gradually broken. This may lead to the increase of communication cost, the increase of computation, the increase of latency time, etc., and thereby the distribution period may become slower again. In this circumstance, a second architecture may be proposed as a method for lowering a degree of coupling between microservices, and the second architecture will be described in conjunction with FIG. 4.

Figure 4:
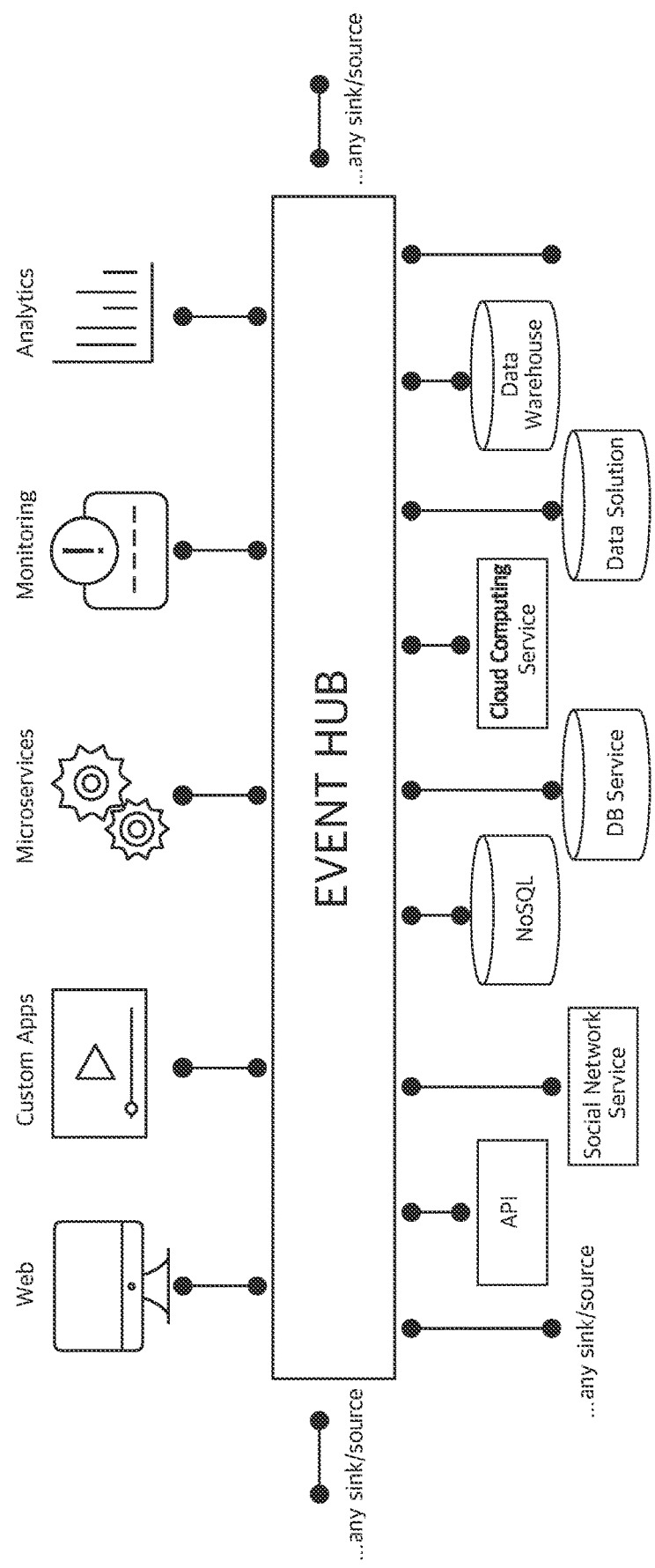
FIG. 4 is a diagram illustrating a second architecture which may be used for complementing the first architecture according to an example embodiment.

FIG. 4 is a diagram illustrating a second architecture which may be used for complementing a first architecture according to an example embodiment.

FIG. 4 illustrates an example 400 of a second architecture for providing a plurality of services according to an example embodiment. The second architecture may be referred to as an event driven architecture, but is not limited to or bound by a specific name.

To be distinguished from the first architecture, this architecture is referred to as a "second architecture," but the first architecture and the second architecture are compatible. Rather, the second architecture is used for complementing the first architecture so that the second architecture may help to overcome disadvantages of the first architecture or use the first architecture in a more advanced direction. Hereinafter, the focus will be on the case that the first architecture and the second architecture are used in combination (this case may be referred to as an event driven microservice).

When an API call or transaction (hereinafter, referred to as a "transaction" for the sake of convenience in explanation) occurs in the second architecture, the system may be configured in a way that the microservice of processing the corresponding transaction publishes an event in a common event bus and another microservice which needs the corresponding event subscribes the event. An example of the common event bus may include Kafka, but the scope of the present disclosure is not limited thereto.

If a system is configured with the second architecture, the flow of data may become clearer and the communication scenario between the microservices may become more simplified, thereby making the system loosely coupled.

If a system is configured based on events, the engineering cost may increase, but there is an advantage from minimizing the communication cost and developing with high level of freedom.

The event hub illustrated in the drawings and the event bus (or the common event bus) described in the present disclosure may be understood as the same concept. Furthermore, the data bus described in the present disclosure may be understood as a concept same as or associated with the event hub and the event bus. Hereinafter, for the sake of the convenience in explanation, the terms will be collectively referred to as the "data bus" in the explanation.

Figure 5A:
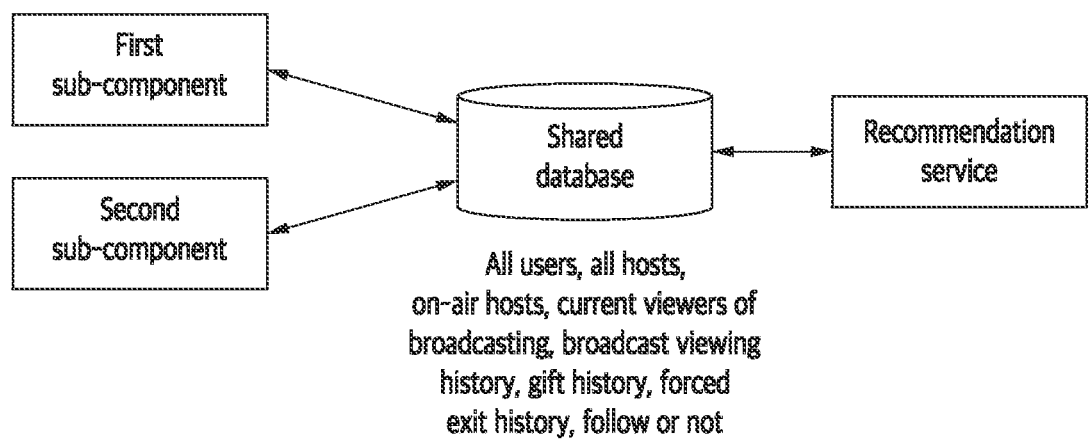
FIGS. 5A and 5B are diagrams illustrating an effect of using a second architecture according to an example embodiment.
Figure 5B:
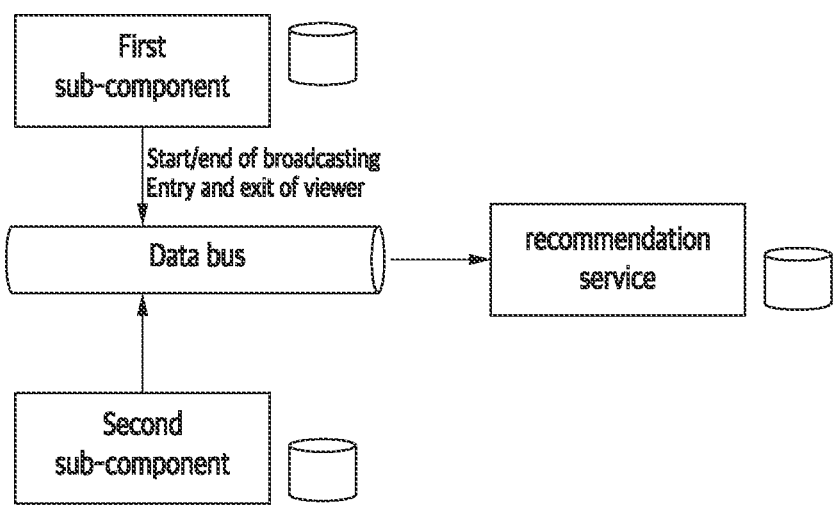

FIGS. 5A and 5B are diagrams illustrating an effect of using a second architecture according to an example embodiment. In FIGS. 5A and 5B, in order to explain the effect of using the second architecture, the "recommendation service" corresponding to a software element has been described as an entity, but it should be understood that the operation of the recommendation service may be embodied by the recommendation server 110.

Referring to FIGS. 5A and 5B, when a recommendation service according to an example embodiment attempts to obtain information on the number of current viewers per broadcasting, the average watch time per broadcasting, and the like in real time (for reference, the information may be included in the second information obtained by the recommendation server 110, but is not limited thereto), if the second architecture is not used, the recommendation service may obtain the information using at least one of a method for requesting for the development of the API which returns the corresponding data to the product backend team and a method of generating a database shared and used in various microservices.

However, in the method for requesting the API to the product microservice, even if the recommendation service wants to use the desired data immediately, the recommendation service should wait until the product team develops the API which returns the corresponding data, and in the meantime, there is a risk of the communication overhead with multiple meeting processes, and thus, not only the productivity may deteriorate, but also the chance of more frequent online experiments of the recommendation model may be reduced.

Further, in a method for sharing a database in various microservices as shown in FIG. 5A, if a query is incorrectly written, the performance of other APIs may be affected, and even if a developer wants to use a write operation with the query, he/she must consider a side effect on other microservices by the write operation before setting out the development, and in the meantime, the communication cost may increase.

On the contrary, in a method using the second architecture as shown in FIG. 5B, the product backend service (associated with the service server 120) publishes an event regarding the broadcast viewing in the data bus, and the recommendation service subscribes to the corresponding event (receiving data), enabling easy calculation of data such as the current viewer count or average watch time per broadcasting. Moreover, the event does not change much once the specification has been determined, and thus the communication is not much required, thereby reducing the communication cost. Furthermore, if the second architecture is used, a scalable system may be naturally embedded and a single point of failure will be reduced, and thus, more stable service operation will be possible. Also, if the recommendation system is configured based on events, a high level of freedom can be guaranteed and the speed of adding new input features may become faster (because the necessary feature may be imported from the event and generated).

In conclusion, the method using the second architecture may resolve the problems regarding the method for requesting APIs to the product microservices and the method with the database shared in various microservices.

Meanwhile, regarding the illustration of FIGS. 5A and 5B, at least one of a first sub-component and a second sub-component may correspond to a server. For example, if the first sub-component and the second sub-component correspond to the server, FIGS. 5A and 5B may be understood as an example embodiment regarding a structure in which one recommendation service may cover a plurality of service servers. Not only in FIGS. 5A and 5B, but also throughout the specification, it can be understood that the first sub-component and the second sub-component may include the server.

FIG. 6 is a detailed diagram illustrating a system for providing recommended broadcasting information based on a second architecture according to an example embodiment.

FIG. 6 illustrates an example 600 of a system based on a second architecture according to an example embodiment. Specifically, the system for providing the recommended broadcasting information may further include a data bus 610. When an event regarding broadcasts occurs, the service server 120 may publish the event in the data bus 610 as indicated by reference numeral 601, and the recommendation server 110 may subscribe to the data bus 610 to receive the data as indicated by reference numeral 602. In other words, the data bus 610 may repeatedly receive the information transmitted from the service server 120, and the recommendation server 110 may obtain at least one of the first information and the second information from the data bus 610.

The data bus 610 may be a component through which data travels. The data traveling to the data bus 610 may include the data published from the service server 120, and the data may be received on a component (or device) such as the recommendation server 110. The data transmitted to the recommendation server 110 may include at least part of user information (this information may have sensitive data redacted), information regarding broadcasts and information regarding viewers. As described above, it may be interpreted that the user information may be included in the first information, the information regarding broadcasts may be included in the second information, and the information regarding viewers may be included in the information regarding broadcasts.

Data loss due to operation errors, for example, in the recommendation server 110 may be prevented by making data pass through the data bus 610 from the service server 120, not to be transmitted directly to the recommendation server 110. Further, the data transmitted from the service server 120 through the data bus 610 may be received and used not only by the recommendation server 110 but also by different devices and components (e.g., moderation product, etc.).

However, the scope of the present disclosure is not limited to the feature that the data to be transmitted from the service server 120 to the recommendation server 110 should be transmitted to the recommendation server 110 through the data bus 610, and in some cases, the data may be transmitted directly from the service server 120 to the recommendation server 110 without passing through the data bus 610.

Meanwhile, it is not necessary that the information should be transmitted to the recommendation server 110 whenever information is transmitted from the service server 120 to the data bus 610, or that the information corresponding to the reference numeral 601 and the information corresponding to the reference numeral 602 should be consistent with each other. In other words, only some pieces of information required by the recommendation server 110, out of the information transmitted from the service server 120 to the data bus 610, may be transmitted to the recommendation server 110, and the transmitting frequency may also be determined differently from the frequency of transmitting information from the service server 120 to the data bus 610.

Throughout the present disclosure, it may be understood that the operations that the recommendation server 110 obtains information from the service server 120 may include not only the case that the recommendation server 110 receives information directly from the service server 120, but also the case that the recommendation server 110 receives the information transmitted from the service server 120 in an indirect way such as passing through another component, for example, the case that the recommendation server 110 obtains the information the service server 120 transmitted to the data bus 610, and the "another component" through which the data passes is not limited to the data bus 610.

The recommendation server 110 according to an example embodiment may transmit a request for at least one of the first information and the second information to the data bus 610. In this case, the request transmitted to the data bus 610 may include the user information regarding the first information (for example, the identification information of the user).

According to an example embodiment, the recommendation server 110 may perform at least part of operations by working in conjunction with a first database 620 set to be associated with the recommendation server 110. For example, the recommendation server 110 according to an example embodiment may identify the third information by obtaining one or more pieces of information from the first database 620. In this case, the information obtained from the first database 620 may be the third information or the information on which the third information is obtained based. For instance, if the third information includes the information about the age group and gender group with the highest preference for a specific host's broadcasting, the information obtained from the first database 620 may include the information of viewers who have watched the specific host's broadcasting (the information on which the third information is obtained based), and may include the information about the age group and gender group with the highest preference for the specific host's broadcasting (the third information itself).

The first database 620 may store at least part of the information regarding the user and the information regarding broadcasts. More specifically, obtaining the first information and the second information after receiving the request by the user may incur different problems as described above, while if the information repeatedly transmitted from the service server 120 (the information regarding the user, the information regarding broadcasts, etc.) has been stored in a database in advance, the recommended broadcast list may be rapidly provided when the request by the user is received, and the first database 620 may play a role of storing the information.

Meanwhile, the service server 120 may perform at least part of the operations by working in conjunction with a second database 630 set to be associated with the service server 120. For example, at least some pieces of the information regarding the user included in the first information and the information regarding broadcasts included in the second information may be stored in the second database 630, and then transmitted to the service server 120.

As such, the recommendation server 110 and the service server 120 use different databases, thereby preventing a problem of the increase in the coupling resulting from the shared database.

FIG. 7 is a diagram illustrating overall operations of a system for providing recommended broadcasting information according to an example embodiment.

Referring to FIG. 7, the recommendation server 110 including a system for providing the recommended broadcasting information according to an example embodiment may include a first sub-unit 710 and a second sub-unit 720. However, it should not be understood that the recommendation server 110 should consist only of the first sub-unit 710 and the second sub-unit 720. In other words, the recommendation server 110 may further include another component other than the first sub-unit 710 and the second sub-unit 720. Further, the recommendation server 110 may not necessarily have to include the first sub-unit 710 and the second sub-unit 720.

According to an example embodiment, the first sub-unit 710 may include an API server and the second sub-unit 720 may operate for obtaining the recommended broadcast list information. The first sub-unit 710 may include, for example, FastAPI. The second sub-unit 720 may include, for example, Apache Flink.

The first sub-unit 710 according to an example embodiment may perform operations such as receiving the request information and operating a machine learning model. The first sub-unit 710 according to an example embodiment may be referred to as Recommend API server. However, the scope of the present disclosure is not limited only to these example embodiments.

The second sub-unit 720 according to an example embodiment may transfer the information received from the data bus 610 to the first database 620. The second sub-unit 720 according to an example embodiment may be referred to as Event Streaming App. However, the scope of the present disclosure is not limited only to these example embodiments.

Meanwhile, according to an example embodiment, the first database 620 may also include a plurality of sub-databases. For example, the first database may include sub-databases such as Redis and SCYLLA. In this regard, the role distribution may be achieved such that, for example, Redis may store more volatile data and SCYLLA may store relatively non-volatile data, but the roles of the sub-databases are not limited only to these examples.

Further, for the sake of convenience in explanation, the first database 620 is illustrated inside of the recommendation server 110, but the scope of the present disclosure is not limited to the configuration that the first database 620 is included in or belongs to the recommendation server 110.

In addition, as described above, at least part of the first information and the third information may be used for determining which model to use, and a plurality of models to be used for each circumstance may include, for example, machine learning model v1 (ML Model v1) and machine learning model v2 (ML Model v2) as illustrated with reference numeral 730. In this regard, for the operation of the models, the open source remote procedure calling system grpc may be used, but the scope of the present disclosure is not limited thereto.

According to an example embodiment, the service server 120 may also include a plurality of sub-components (first sub-component, second sub-component, etc.). The plurality of sub-components included in the service server 120 may be associated with different broadcasting services, but the scope of the present disclosure is not limited thereto.

Figure 8:
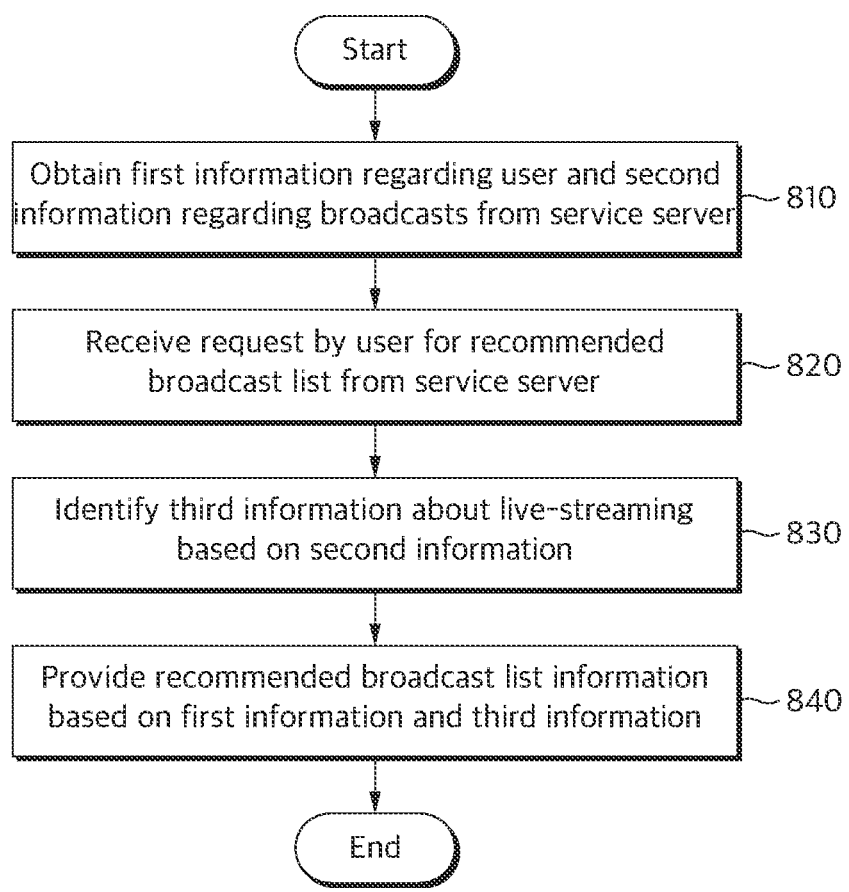
FIG. 8 is a flowchart illustrating operations of a method for providing recommended broadcasting information of a recommendation server according to an example embodiment.

FIG. 8 is a flowchart illustrating operations of a method for providing recommended broadcasting information of a recommendation server according to an example embodiment.

Referring to FIG. 8, in operation 810, the recommendation server 110 according to an example embodiment obtains first information regarding a user and second information regarding broadcasts from the service server 120. The recommendation server 110 may repeatedly obtain information regarding the user and information regarding broadcasts from the service server 120. In this case, it can be understood that the first information and the second information comprehensively refer to a plurality of pieces of information repeatedly obtained.

In operation 820, the recommendation server 110 receives a request by the user for the recommended broadcast list from the service server 120. In operation 830, the recommendation server 110 which receives the request by the user identifies the third information about the live-streaming broadcast based on the second information in response to the request. The third information may include at least one of broadcasting history information corresponding to a host of the live-streaming broadcast, and viewer information of the live-streaming broadcast.

In operation 840, the recommendation server 110 provides the recommended broadcast list information based on the first information and the third information. The recommendation server 110 may obtain the recommended broadcast list information using machine learning based on the first information and the third information. In this regard, at least part of the first information and the third information may be used as an input of a machine learning model. Further, at least part of the first information and the third information may be used for determining which model to use.

Figure 9:
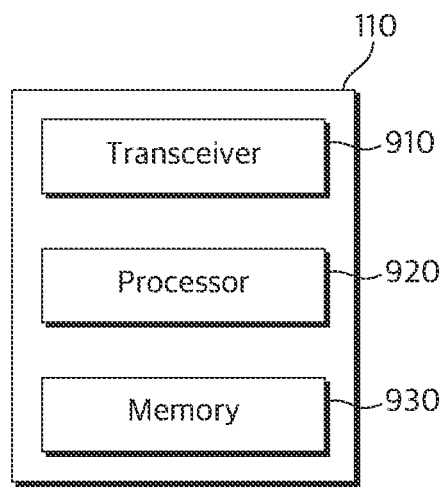
FIG. 9 is a diagram illustrating an example of a configuration of a recommendation server for providing recommended broadcasting information according to an example embodiment.

FIG. 9 is a diagram of an example of the configuration of a recommendation server for providing recommended broadcasting information according to an example embodiment.

Referring to FIG. 9, the recommendation server 110 includes a transceiver 910, processor 920, and memory 930. The recommendation server 110 may be connected with the service server 120, the data bus 610, and other external devices through the transceiver 910 to exchange data.

The processor 920 may include at least one device as described above in conjunction with FIGS. 1 to 8, or perform at least one method described above in conjunction with FIGS. 1 to 8. The memory 930 may store information for performing at least one method as described above in conjunction with FIGS. 1 to 8. The memory 930 may be a volatile memory or a non-volatile memory.

The processor 920 may execute a program and control the recommendation server 110 for providing information. Code of a program executed by the processor 920 may be stored in the memory 930.

Further, the recommendation server 110 of an example embodiment may further include an interface for providing information to a user.

Meanwhile, the preferred example embodiments of the present disclosure have been disclosed in the present the specification and drawings, and although specific terms have been used, they have merely been used in a general sense to easily describe the technical content of the present disclosure and to aid understanding of the present disclosure, and are not intended to limit the scope of the present disclosure. It is obvious to those of ordinary skill in the art to which the present disclosure pertains that other modifications based on the technical idea of the present disclosure can be implemented in addition to the example embodiments disclosed herein.

The recommendation servers, electronic devices or terminals described in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present example embodiments may be represented by functional blocks and various processing steps. These functional blocks may be implemented by various numbers of hardware and/or software configurations that execute specific functions. For example, the present embodiments may adopt integrated circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, assembler and Python including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described example embodiments are merely examples and other embodiments may be implemented within the scope of the following claims.

What is claimed is:

1. A method for providing information by a recommendation server, the method comprising:
   subscribing to an event bus, wherein the event bus receives events regarding broadcasts from a service server;
   responsive to an event regarding broadcasts being published from the service server to the event bus, obtaining, from the service server, first information regarding a user and second information regarding at least one broadcast, wherein the second information regarding at least one broadcast comprises information regarding a host of the at least one broadcast;
   receiving a request for a recommended broadcast list from the service server;
   identifying, in response to the request, third information about a live-streaming broadcast based on the second information;
   obtaining recommended broadcast list information based on the first information and the third information, wherein the third information includes at least one of broadcasting history information corresponding to a host of the live-streaming broadcast and viewer information of the live-streaming broadcast; and
   providing the recommended broadcast list information to the user, wherein the providing of the recommended broadcast list information includes
      identifying a beginner host based on at least one of the broadcasting history information and the viewer information, and
      determining a recommended broadcast list such that a portion of the broadcast by the beginner host is higher than a predetermined value.

2. The method of claim 1, wherein the obtaining of the first information and the second information comprises:
   obtaining at least one of the first information and the second information from a data bus which repeatedly receives information transmitted from the service server.

3. The method of claim 2, wherein the obtaining of the first information and the second information further comprises:
   transmitting a request for at least one of the first information and the second information to the data bus, where the request transmitted to the data bus comprises information on the user.

4. The method of claim 1, wherein the identifying of the third information comprises:
   obtaining one or more pieces of information from a database set to be associated with the recommendation server.

5. The method of claim 1, wherein the recommendation server obtains the recommended broadcast list information by using machine learning based on the first information and the third information.

6. The method of claim 5, wherein the obtaining of the recommended broadcast list information comprises:
   determining a model for using the machine learning based on at least one of the first information, the second information, and the third information.

7. The method of claim 1, wherein the third information comprises broadcasting image information corresponding to the live-streaming broadcast, and
   the broadcasting image information comprises at least one of thumbnail image information regarding streaming of the live-streaming broadcast and information regarding an image captured from a live broadcast screen corresponding to the streaming.

8. The method of claim 1, wherein the recommendation server comprises:
   a first sub-unit comprising an application programming interface (API) server; and
   a second sub-unit configured to obtain the recommended broadcast list information.

9. The method of claim 1, wherein at least one of the first information and the second information corresponds to information obtained by the service server from a database set to be associated with the service server.

10. The method of claim 1, wherein the first information comprises at least one of:
    account information of the user;
    personal information of the user; and
    broadcast viewing history information of the user.

11. The method of claim 1, wherein the service server comprises a plurality of sub-components associated with different broadcasting services.

12. A non-transitory computer-readable recording medium wherein a program to execute the method of claim 1 in a computer is recorded.

13. A system for providing recommended broadcast list information, the system comprising:
    a service server configured to provide a broadcasting service; and
    a recommendation server configured to provide recommended broadcast list information based on received information,
    wherein the recommendation server is configured to:
       subscribe to an event bus, wherein the event bus receives events regarding broadcasts from the service server;
       responsive to an event regarding broadcasts being published from the service server to the event bus, obtain, from the service server, first information regarding a user and second information regarding at least one broadcast, wherein the second information regarding at least one broadcast comprises information regarding a host of the at least one broadcast;
       receive a request for a recommended broadcast list from the service server;
       identify, in response to the request, third information about a live-streaming broadcast based on the second information;
       obtain recommended broadcast list information based on the first information and the third information, wherein the third information includes at least one of broadcasting history information corresponding to a host of the live-streaming broadcast and viewer information of the live-streaming broadcast; and
       provide the recommended broadcast list information to the user, wherein the providing of the recommended broadcast list information includes
          identifying a beginner host based on at least one of the broadcasting history information and the viewer information, and determining a recommended broadcast list such that a portion of the broadcast by the beginner host is higher than a predetermined value.

14. The system of claim 13, wherein the system further comprises a data bus which provides a data travel path for data transmission and reception between servers, and the recommendation server is configured to obtain at least one of the first information and the second information from the data bus which repeatedly receives information transmitted from the service server.

15. The system of claim 13, wherein the system further comprises a database set to be associated with the recommendation server, and the recommendation server is configured to obtain one or more pieces of information from the database set to be associated with the recommendation server to identify the third information.

16. The system of claim 13, wherein the recommendation server is configured to obtain the recommended broadcast list information by using machine learning based on the first information and the third information.

17. The system of claim 13, wherein the system further comprises a database set to be associated with the service server, and at least one of the first information and the second information corresponds to information obtained by the service server from the database set to be associated with the service server.

* * * * *